United States Patent [19]

Aubert

[11] 4,421,136

[45] Dec. 20, 1983

[54] FLEXIBLE TUBULAR CONDUIT FOR TRANSFERRING FLUIDS PARTICULARLY AT HIGH TEMPERATURE AND/OR PRESSURE AND PIPING COMPRISING SUCH A CONDUIT

[75] Inventor: Jean-Paul Aubert, Puteaux, France

[73] Assignee: Coflexip, Paris, France

[21] Appl. No.: 239,126

[22] Filed: Feb. 27, 1981

[30] Foreign Application Priority Data

Feb. 28, 1980 [FR] France .................. 80 04439

[51] Int. Cl.³ .............................................. F16K 49/00
[52] U.S. Cl. ...................................... 137/340; 220/219
[58] Field of Search ............... 138/103, 111, 149; 165/154, 156; 137/340, 334; 220/219

[56] References Cited

U.S. PATENT DOCUMENTS

| 607,932 | 7/1898 | Husham | 138/111 |
|---|---|---|---|
| 1,994,934 | 3/1935 | Wagenseller | 165/156 |
| 2,482,468 | 9/1949 | Cranmer | 220/219 |
| 2,497,645 | 2/1950 | Wiggins | 220/219 |
| 2,936,791 | 5/1960 | Farrar | 138/111 |
| 2,980,172 | 4/1961 | Thompson | 137/340 |
| 3,315,703 | 4/1967 | Matthews et al. | 138/111 |
| 3,941,159 | 3/1976 | Toll | 138/149 |
| 4,194,536 | 3/1980 | Stine et al. | 138/103 |
| 4,279,270 | 7/1981 | Francis | 137/340 |

FOREIGN PATENT DOCUMENTS

| 236427 | 7/1911 | Fed. Rep. of Germany | 220/219 |
|---|---|---|---|
| 618728 | 3/1927 | France | 165/154 |

Primary Examiner—John W. Shepperd
Attorney, Agent, or Firm—Brisebois & Kruger

[57] ABSTRACT

A drain pipe arrangement for draining water from a floating roof of a storage reservoir includes a flexible drain pipe connected to the roof, and a flexible heating element within the drain pipe. The flexible heating element takes the form of two rigid metal tubes twisted on each other and having their upper ends connected together. A pump and heater provide for circulating heated fluid through the tubes to prevent drain water from freezing in the drain pipe.

8 Claims, 6 Drawing Figures

FLEXIBLE TUBULAR CONDUIT FOR TRANSFERRING FLUIDS PARTICULARLY AT HIGH TEMPERATURE AND/OR PRESSURE AND PIPING COMPRISING SUCH A CONDUIT

The present invention relates to a flexible tubular conduit usable particularly for transferring fluids at high temperature and/or high pressure.

The tubular conduit according to the invention is characterized essentially by the fact that it includes at least two rigid metallic tubes, particularly of steel, twisted on each other, that is to say, without any central support. Preferably, the angle of twisting is comprised between 10° and 20° and advantageously on the order of 15°.

A tubular conduit is thus realized, for example having two twisted together tubes which can be used as the internal heating element of a pipe system by circulating therethrough a hot fluid, such as for example, water, oil or steam.

As a specific application one may cite the drainage piping connected to movable tops or roofs of storage reservoirs, and which serve to drain off rain water to the ground.

The use of conduits according to the present invention permitting the circulation of a very hot heating fluid is particularly important in applications such as all those where because of the presence of explosive gases, the presence of electrically heated flexible electrical wiring is prohibited.

As another important application of the tubular conduits according to the invention, one could cite the piping used to supply water vapor or steam at high temperature, on the order of several hundreds of degrees, and at very high pressure, of the order of 60 bars from a seismic source in the process known under the trademark of "Vaporchoc" carried out by Compagnie Generale de Geophysique.

In this application it is advantageous to use a tubular conduit according to the invention made up of three tubes twisted together equipped with a heat insulating layer and furnished with an external protective sheath.

In one of many other possible applications of the tubular conduits according to the invention, one could cite the providing of supply lines for the circulation of control fluid between submerged elements and the surface, for example for control at well heads, for the productions of hydrocarbons, for mobile vehicles on the ocean floor, etc.

Other advantages and characteristics of the invention will become apparent from the following description of particular examples of embodiments with reference to the attached drawings in which.

Figure 1:
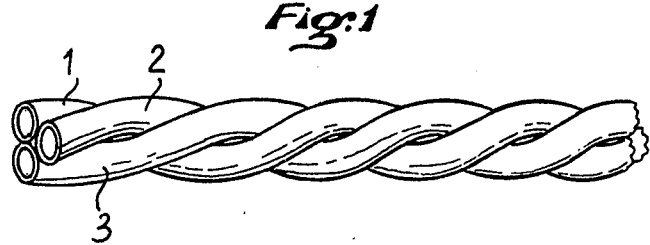
FIG. 1 shows a cut away tubular conduit having three metal tubes twisted together.

Referring to FIG. 1, one sees a tubular flexible conduit according to the invention made by twisting around themselves three metallic tubes 1, 2, 3, in particular of steel. The angle of twist of these tubes is preferably approximately 15° with respect to the longitudinal axis of the conduit.

To produce the bundle of assembly, one passes the different metallic tubes through guides inclined at the desired angle, in this case 15°, with respect to the axis of the product formed, the guides being fixed to a support which can be rotated by any appropriate means, usually by hand.

One has formed, by way of example, such tubular conduits made of stainless steel tubes with an inside diameter of 12 mm and a wall thickness of 2 and 4 mm, respectively.

In spite of the rigidity of the steel tubes used it is recognized that the tubular conduit produced according to the invention can be wound and unwound numerous times with a relatively small radius of curvature without significant structural changes. Thus winding tests have shown that the resulting conduits may be wound and unwound more than twenty times on a cylindrical drum 600 mm in diameter without the occurence of any particular anomaly. Moreover, traction or tension tests have shown a very high stability of the tubular conduit, that is, there has been no significant distortion at traction values of above three tons.

Finally bursting or rupture tests have shown a remarkable resistance to pressures more than 700 bars for a conduit composed of tubes 2 mm in wall thickness and more than 1300 bars for a conduit composed of tubes 4 mm in wall thickness.

The tubular conduit thus obtained can be used as a supply line, or as a line for transferring fluids at high temperature and/or high pressure in numerous applications such as, for example, for the transfer of steam in the seismic exploration process know under the name, Vaporchoc.

Figure 2:
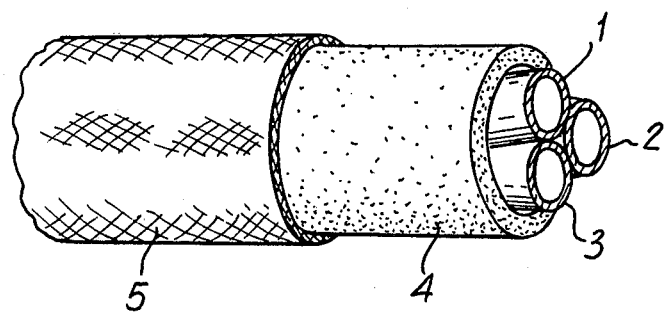
FIG. 2 shows a tubular conduit according to FIG. 1 having a heat insulating layer and an external sheath.

In these different applications the flexible tubular conduit such as that shown on FIG. 1 is advantageously sheathed and if necessary, provided with a heat insulating layer, and one example of such an embodiment is shown at FIG. 2.

The heat insulating layer 4 can be made of any appropriate material suitable for the use intended and one has, for example, used material known under the name "cerarope B" in the shape of a stranded cord with a diameter of 13 mm, this material being, for example, placed in two layers wound radially so as to present a thickness after compressing of about 20 mm.

The external protective sheath 5 can also be made of any appropriate material such as, for example, rilsan alone or in combination with other materials such as plastomers or elastomers.

Refer now to FIGS. 3 to 6 which show another important application of the flexible tubular conduit according to the invention.

Figure 6:
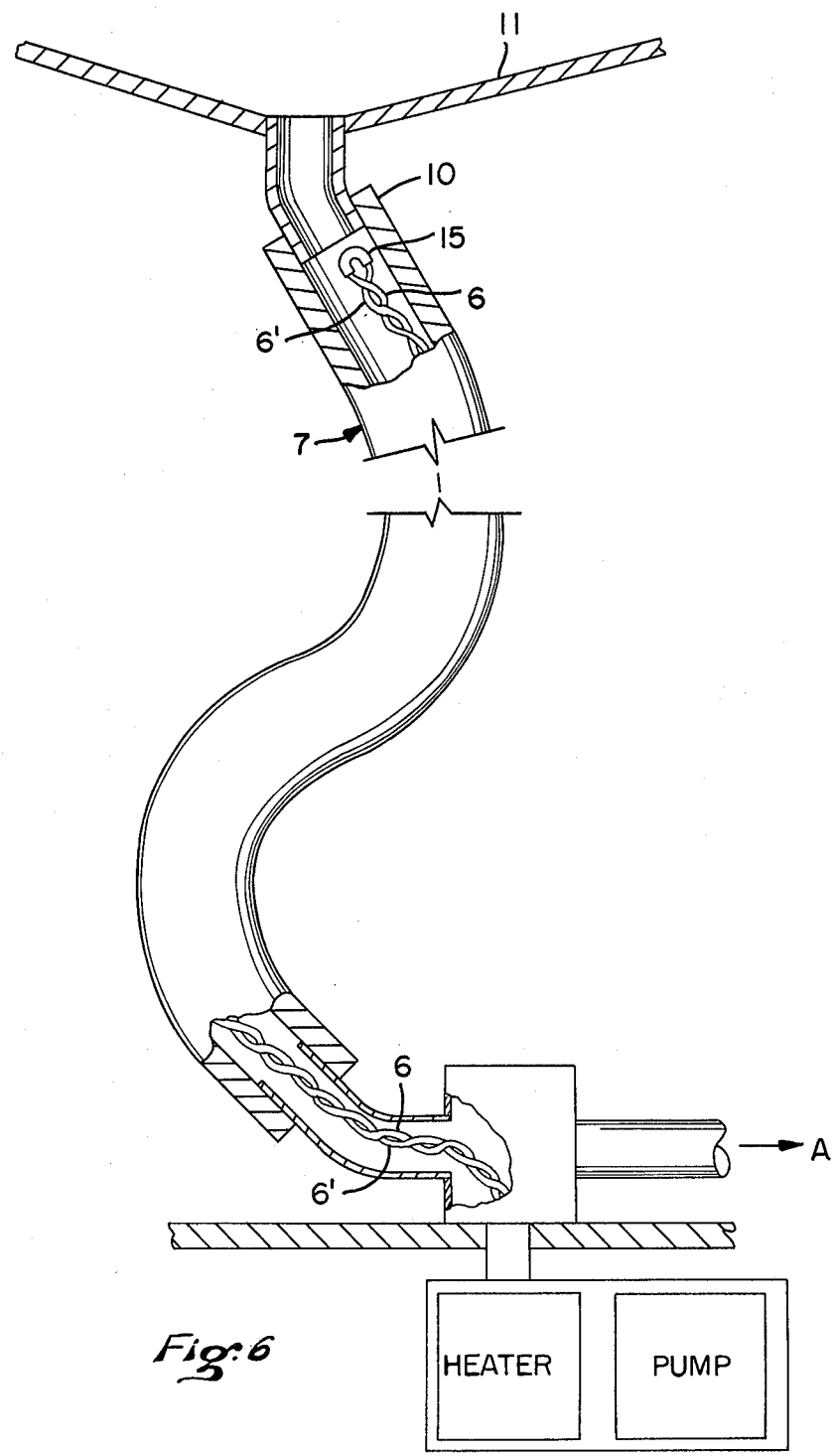
FIG. 6 is an enlarged view in section showing the drain pipe of FIG. 4 in greater detail.

This latter, shown on FIG. 6 as composed of two tubes 6, 6' twisted together, is used as a heating element inside a drain pipe or "drain-hose" designated overall by 7 and which may have any shape, for example being composed of a wound crimped metal strip 8 covered with an external sheath 9, the wound strip 8 possibly also having an appropriate interior covering.

Figure 3:
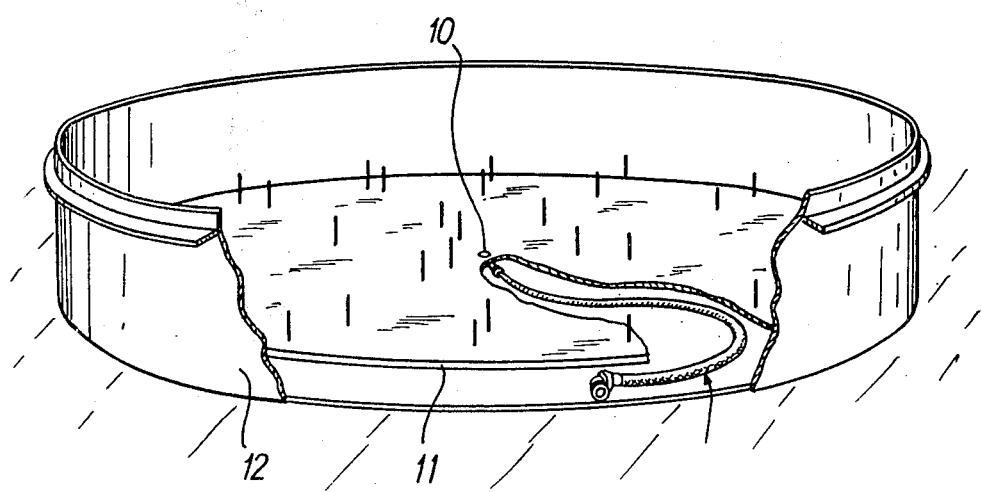
FIG. 3 shows in cut away perspective a storage reservoir as an application of use of a tubular conduit according to the invention.
Figure 4:
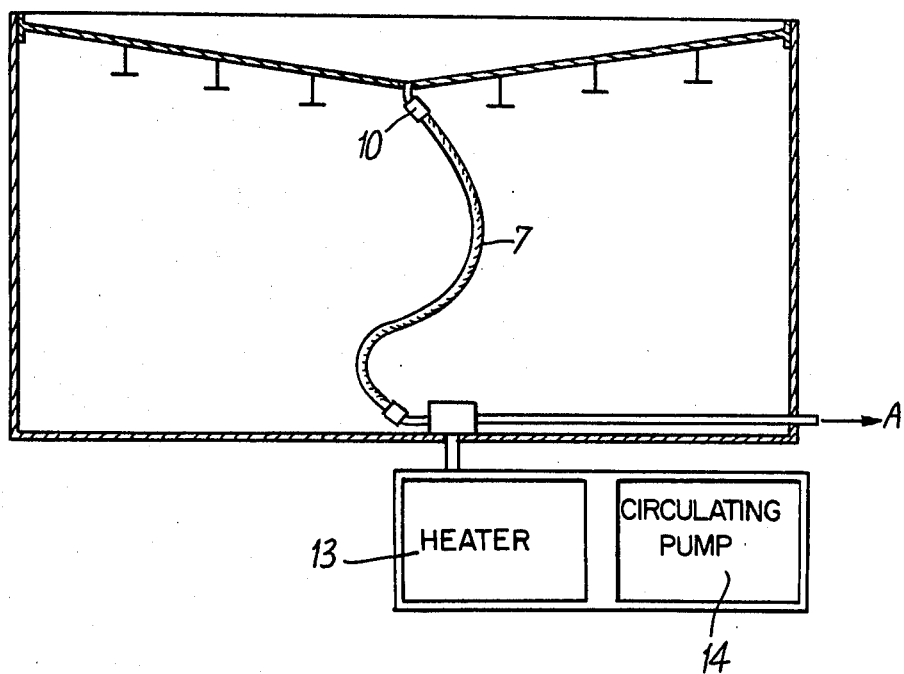
FIG. 4 is a schematic view in section of a storage reservoir permitting use of the present invention.

As may be seen on FIGS. 3, 4 and 6 drain pipe 7 is fixed at one of its ends at 10 to a floating roof 11, which is, vertically movable, of a storage reservoir 12.

The drain pipe allows the rain water which would otherwise accumulate on the flat roof of the reservoir to be removed, this removal being shown schematically by arrow A on FIG. 4.

Figure 5:
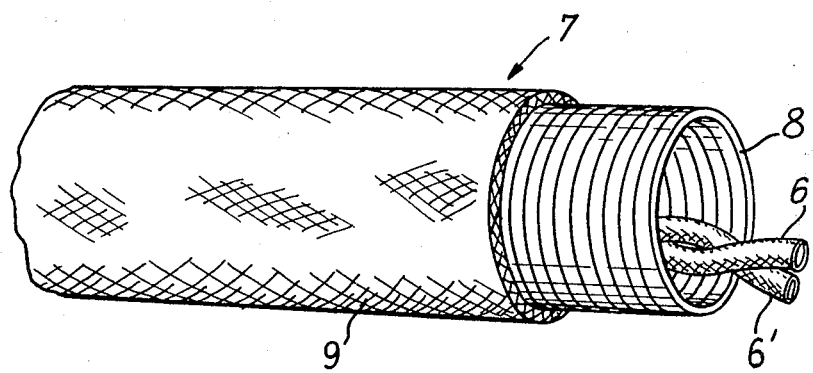
FIG. 5 shows a drain pipe usable in a storage reservoir, and furnished with a tubular conduit according to the invention as a heating element.

For heating of such a drain pipe a flexible tubular conduit according to the invention such as that shown on FIGS. 5 and 6 is used, and through the inside of the tubes 6 and 6' of which a heating fluid such as hot water, hot oil, or steam is circulated.

FIG. 4 illustrates the heating circuit comprised of a source of hot fluid or a central heater 13 associated with a circulating pump 14.

In the case of an embodiment with two tubes, as shown on FIG. 5, the heating fluid is introduced into one of the tubes of the conduit and returns through the other tube. The ends of the tubes are connected together as at 15 in FIG. 6 near the roof 11 so that the heating fluid can be circulated through the tubes.

By way of example, the invention has been used in a drain pipe with a diameter of 101.6 mm consisting of a wound strip of stainless steel covered with a 5 mm thick sheath of rilsan.

The flexible tubular conduit according to the invention consists of two tubes of stainless steel with an interior diameter of 12 mm and a wall thickness of 4 mm twisted on each other with a twist angle of 15°.

A hydraulic oil with a viscosity at 30° of 10 cp and specific heat of 0.5 kilocaloric per kilo (°C.) is used as a heating oil.

By way of example, such a drain pipe was used in a reservoir requiring a 20 m length of drain pipe with a temperature outside the pipe of −17° C.

Excellent performance was obtained with a heater with a power of approximately 9 kilowatts, the power of the circulating pump being 180 watts.

Although the invention has been described in connection with preferred embodiments and applications, it is of course in no way thereby limited and may undergo numerous variations and modifications without exceeding either its scope or its spirit.

I claim:

1. A drain pipe arrangement for draining water from a floating roof of a storage reservoir comprising, a flexible drain pipe connected to a drain connection at the roof, said drain pipe having a water flow passage therein, said pipe extending downwardly and having a discharge end to discharge water flowing through the flow passage in the pipe, a flexible heating element within said flow passage and extending the length of the drain pipe, said heating element comprising at least two rigid metal tubes twisted on each other, means connecting said metal tubes together at a location near the roof so that a heating fluid can be introduced into one of the tubes and returns through another tube, means for circulating a heating fluid through said rigid metal tubes within said drain pipe, from a location adjacent a lower portion of said drain pipe.

2. Drain pipe arrangement according to claim 1, wherein the tubes are twisted together at a twist angle of between 10° and 20°.

3. Drain pipe arrangement according to claim 2, wherein the twist angle is approximately 15°.

4. Drain pipe arrangement according to claim 3 wherein the drain pipe has an external protection sheath.

5. Drain pipe arrangement according to claim 4, wherein the sheath covers a flexible metal layer surrounding the flow passage.

6. Drain pipe arrangement according to claim 5, wherein the tubes comprise stainless steel tubes.

7. Drain pipe arrangement according to claim 6, wherein the water flow passage of the drain pipe has an inside diameter much greater than the size of the twisted tubes.

8. Drain pipe arrangement according to claim 1 wherein said drain pipe has a heat insulating layer.

* * * * *